US005707569A

United States Patent [19]

Priester et al.

[11] Patent Number: 5,707,569
[45] Date of Patent: Jan. 13, 1998

[54] PROCESSING AID SYSTEM FOR POLYOLEFINS

[75] Inventors: Donnan Edwin Priester, Greenville; Charles Winfield Stewart, Newark, both of Del.

[73] Assignee: E. L Du Pont de Nemours and Company, Wilmington, Del.

[21] Appl. No.: 196,740

[22] Filed: Feb. 15, 1994

[51] Int. Cl.$^6$ ............................ C08L 23/04; B29K 27/12
[52] U.S. Cl. ............................ 264/39; 134/8; 134/22.11; 264/169; 264/211; 264/349; 525/199; 525/200
[58] Field of Search ................ 134/7, 8, 22.11, 134/22.14; 525/240, 199, 200; 264/39, 211, 349, 169

[56] References Cited

U.S. PATENT DOCUMENTS

| | | |
|---|---|---|
| 3,125,547 | 3/1964 | Blatz . |
| 4,704,423 | 11/1987 | Iwanami et al. ............ 524/417 |
| 4,740,341 | 4/1988 | Chu ............................... 264/211 |
| 4,764,326 | 8/1988 | Hakim ........................... 264/211 |
| 4,829,116 | 5/1989 | Piesold ........................... 525/199 |
| 4,855,360 | 8/1989 | Duchesne et al. ............ 525/187 |
| 4,904,735 | 2/1990 | Chapman, Jr. et al. ...... 525/199 |
| 5,064,594 | 11/1991 | Priester et al. ................ 264/169 |
| 5,089,200 | 2/1992 | Chapman, Jr. et al. ...... 264/169 |
| 5,106,911 | 4/1992 | Chapmen, Jr. et al. ...... 264/211 |
| 5,281,381 | 1/1994 | Su ................................. 264/169 |

OTHER PUBLICATIONS

Johnson et al., Factors Affecting the Interaction of Polyolefin Additives with Fluorocarbon Elastomer Polymer Processing Aids, *Polymers, Laminations and Coatings Conference, TAPPI Proceedings*, 249–256, 1988.

Danneels, Low Molecular Weight Ionomers as Processing Aids and Additives, *High Performance Additives Conference, London*, 14 pages, May 10, 1988.

*Primary Examiner*—Mathieu D. Vargot

[57] ABSTRACT

Polar-side-group-containing extrusion adjuvants, such as ethylene diamine tetraacetic acid or ionomer, that counteract the deleterious effect of certain additives such as zinc stearate, used in polyolefins on the performance of fluoropolymer processing aids in polyolefins are taught.

25 Claims, No Drawings

PROCESSING AID SYSTEM FOR POLYOLEFINS

FIELD OF THE INVENTION

This invention is in the field of processing aids for polyolefins containing other additives.

BACKGROUND OF THE INVENTION

Fluoropolymers are known to be useful as processing aids when used in low concentration in other polymers to mitigate effects such as melt fracture or high torque that limit rate of extrusion of these host polymers, thereby improving processibility. Polyolefins are a class of host polymers of particular interest.

Blatz in U.S. Pat. No. 3,125,547 discloses the use of fluoropolymers in polyolefins to facilitate extrusion. A general requirement taught by Blatz is that the fluoropolymer must be molten or fluid at the processing temperature $T_p$ of the polyolefin. Various two-component process aids have been identified in attempts to achieve better performance than that provided by the single component of Blatz. For example, Chapman & Priester in U.S. Pat. No. 4,904,735 disclose a synergistic combination of solid and fluid fluoropolymers, e.g., a fluoroelastomer and an unmelted fluoroplastic, to achieve enhanced process aid performance. As a further example, Duchesne & Johnson in U.S. Pat. No. 4,855,360 disclose a combination of a fluorocarbon polymer and a poly(oxyalkylene) polymer to reduce melt defects in extruded hydrocarbon polymer.

Polyolefins may contain assorted additives used in the art, such as but not limited to antioxidants, acid scavengers, light stabilizers, pigments, slip agents, lubricants, and freely divided solids such as silica or talc that may be incorporated as antiblock agents. Calcium carbonate is used as a pigment and also as an antiblock agent. Iwanami & Moriyama in U.S. Pat. 4,704,423 disclose the use of hydrotalcite to reduce gel formation in blends of olefin resin having residual chlorine due to Ziegler catalyst and hydrolyzed ethylene-vinyl acetate copolymer (EVOH), and disclose further benefit if a metal salt of a higher fatty acid is used along with the hydrotalcite. Such additives have the potential to reduce the effectiveness of a processing aid. Fatty acid derivatives and similar compounds, e.g., calcium stearate or zinc stearate, are among the materials sometimes used in polyolefins, as acid scavengers, for example. Johnson et al. in "Factors Affecting the Interaction of Polyolefin Additives with Fluorocarbon Elastomer Polymer Processing Aids" (1988 Polymers, Laminations and Coatings Conference, TAPPI Proceedings, pages 249–256) indicate that calcium stearate and zinc stearate have little or no effect on processing aid performance. At the same time, a footnote mentions evidence for chemical reactivity of calcium stearate with the fluoroelastomer processing aid used in the reported study. Other experience indicates that calcium and zinc stearates can interfere with the performance of fluoropolymer processing aids.

Danneels in "Low Molecular Weight Ionomers as Processing Aids and Additives") (presented at the High Performance Additives Conference, 1988, London) discusses the utility of low molecular weight ionomers for dispersing pigments in plastics, for coupling filler to plastic matrix, as a processing aid for engineering resins, as a nucleating agent in PET, and as a polymer blend compatibilizer. There is no disclosure of the low molecular weight ionomers in conjunction with fluoropolymer processing aids in polyolefins containing acid scavengers.

SUMMARY OF THE INVENTION

This invention provides polar-side-group-containing extrusion adjuvants that counteract the deleterious effect of certain additives used in polyolefins on the effectiveness of fluoropolymer processing aids in polyolefins.

Specifically, it provides an extrusion composition comprising polyolefin, additive having divalent or trivalent metal ions and organic or inorganic anions, fluoropolymer processing aid, and an amount of polar-side-group-containing extrusion adjuvant effective to counteract the deleterious effect of said additive on the performance of said processing aid in extrusion of said composition.

A processing aid system composition comprising fluoropolymer processing aid and polar-side-group-containing extrusion adjuvant is also provided.

The invention further provides an extruder purge composition comprising polyolefin and polar-side-group-containing extrusion adjuvant.

DETAILED DESCRIPTION OF THE INVENTION

It has been discovered that extrusion adjuvants containing polar side groups counteract the deleterious effect of certain additives used in polyolefins on the performance of fluoropolymer processing aids in polyolefins. By "counteract" is meant that the use of polar-side-group-containing extrusion adjuvant at least partially, though not necessarily completely, cancels an increase caused by the additive in the amount of processing aid required to achieve the effect for which the processing aid is used. In the examples to follow, the amount of processing aid required to eliminate melt fracture is the measure used to illustrate the invention.

Additives that can interfere with the performance of fluoropolymer processing aids include salts of the broad class of carboxylic acids, such as caprylic acid, lauric acid, palmitic acid and stearic acid, and hydroxy-carboxylic acids such as lactic acid, maleic acid, tartaric acid and citric acid. Such additives are sometimes used in polyolefins as acid scavengers or as lubricants, and possibly for other purposes. Various inorganic compounds are also used as additives in polyolefins, commonly as acid scavengers but also as pigments or antiblock agents. Anions in such inorganic compounds include, for example, oxide, hydroxide, carbonate, phosphate, and sulfate. The foregoing compounds with organic or inorganic anions have cations that are divalent and/or trivalent metals, such as calcium, magnesium, zinc and aluminum. Thus, interferring additives are illustrated by calcium stearate, zinc stearate, calcium lactate, magnesium lactate, calcium carbonate, potassium aluminum sulfate (alum), and the array of hydrotalcite compounds such as magnesium aluminum hydroxide carbonate hydrate or magnesium aluminum hydroxide monohydrogen-orthophosphate hydrate.

The fluoropolymer processing aids that can be used in the practice of this invention include those known in the art and used to mitigate effects such as melt fracture, high extrusion pressure, or high torque that limit rate of extrusion of the host polyolefins, and such as formation of deposits at the die exit and fluctuations in extrusion pressure or extrusion rate. They include the broad class of fluoropolymers that are molten or fluid at the processing temperature of the polyolefin, as taught by Blatz, including fluoroelastomers and fluoroplastics with relatively low melting temperature. Such low-melting fluoroplastics include but are not limited to polyvinylidene fluoride, copolymers of tetrafluoroethylene (TFE) and hexafluoropropylene (HFP) disclosed in U.S. Pat. No. 5,266,639, copolymers of TFE and perfluoro (methyl vinyl) ether, and copolymers of TFE, HFP and vinylidene fluoride ($VF_2$). The fluoropolymer processing aids used in the practice of this invention also include various multi-component processing aid systems, in which at least one fluoropolymer is used in conjunction with other material. Other material can also be fluoropolymer, compositionally different from first fluoropolymer, such as disclosed, for example, by Chapman & Priester. In general, the fluoropolymer processing aids that can be used in this invention have fluorine to carbon ratio of at least 1:2, and preferably at least 1:1.

Preferred polar-side-group-containing extrusion adjuvants that can be used in the practice of this invention contain essentially no fluorine, have at least two carbon atoms not in polar side groups, have at least four polar side groups, and have at least one polar side group for each 100 carbon atoms, preferably 50 carbon atoms, and most preferably 35 carbon atoms that are not in polar side groups. Polar side groups include but are not limited to carboxylic acid, salt of carboxylic acid, ester, hydroxyl, and carbonyl. As an illustration, ethylene diamine tetraacetic acid (EDTA) contains two carbon atoms not in side groups, four carboxylic acid groups (polar side groups), and a ratio of polar side groups to carbon atoms not in side groups of 2. As a further illustration, a copolymer of ethylene and 3 mol % methacrylic acid has 3 polar side groups for each 100 carbon atoms that are not in polar side groups. In a molecule such as EDTA, the polar groups may more properly be pendant groups, but for purposes of this invention are called side groups. More than one polar-side-group-containing extrusion adjuvant can be used, but generally a single adjuvant is used alone.

Compounds that can be used as extrusion adjuvants include EDTA and salts of EDTA. Polar-side-group-containing compounds that can be used also include polymers containing repeat units derived from monomers used in polymerization that introduce polar side groups into the polymer. The side groups can be introduced directly as results when a monomer such as acrylic acid or vinyl acetate is used, or indirectly as results when an incorporated vinyl acetate is hydrolyzed to a vinyl alcohol unit or when the carboxylic acid side group of an incorporated methacrylic acid unit is neutralized with a metal ion, in which case an incorporated polar side group is converted to another polar side group. Polar side groups can also be introduced into a polymer by post-polymerization grafting, such as the grafting of an a,b-unsaturated carboxylic acid or of maleic anhydride onto a polyolefin. The monomers that introduce polar side groups into the polymer can include but are not limited to a,b-unsaturated carbonyl compounds, vinyl esters, and carbon monoxide. Specific examples of monomers that can be used include acrylic acid, methacrylic acid, methyl acrylate, methyl methacrylate, and vinyl acetate, which are preferred.

Polymers containing repeat units derived from monomers that introduce polar side groups into the polymer can be homopolymers of such monomers, copolymers of such monomers with non-polar monomers such as olefins, copolymers of such monomers with one or more other such monomers, or copolymers of such monomers with one or more other such monomer and non-polar monomers. Illustrative polymers include vinyl ester homopolymers, copolymers of olefin and vinyl ester, and copolymers of olefin and a,b-unsaturated $C_3$–$C_8$ carboxylic acid. Specific examples include polyvinylacetate, ethylene/vinyl acetate copolymer, ethylene/acrylic acid copolymer, and ethylene/methacrylic acid copolymer, which are preferred in themselves and as certain derivatives thereof. Preferred derivatives include polyvinyl alcohol, ethylene/vinyl alcohol copolymer, and ionomeric polymers (ionomers) made by at least partially neutralizing the acid moiety of ethylene/acrylic acid copolymer or ethylene/methacrylic acid copolymer by at least one cation such as lithium, sodium, potassiium, magnesium, calcium, barium, lead, tin, zinc, or aluminum. Ionomers are well known in the art; see Rees, U.S. Pat. No. 3,262,272, for example.

Polymeric polar-side-group-containing extrusion adjuvants are preferred, and ionomer resins are most preferred. The molecular weight, or melt viscosity, of such polymeric adjuvants is not critical but such polymers are preferably solid at room temperature.

The polar-side-group-containing extrusion adjuvant should have adequate thermal stability at the extrusion temperature of the polyolefin, so as not to cause adverse effects on the polyolefin such as objectionable discoloration. For example, in the course of extruding polyethylene containing calcium stearate and fluoroelastomer processing aid, but still exhibiting melt fracture in the extrudate, a qualitative experiment was done in which some table sugar was added to the extruder feed. Melt fracture disappeared and die pressure dropped, consistent with the chemical composition of sugar and the general definition of polar-side-group-containing extrusion adjuvant. However, the extrudate became discolored and a strong carmel odor was emitted, consequences that would be objectionable for most extrusions. This experiment demonstrated the role of the polar groups in providing the adjuvant effect, and the need for an acceptable skeleton, usually a carbon atom backbone, to serve as a carrier for the polar groups without causing other deleterious effects, e.g., discoloration. It is believed that the polar-side-group-containing extrusion adjuvant of this invention operates to prevent deposition of interferring additive on metal surfaces, e.g., die surfaces, of the extrusion equipment, possibly coupled with removal of deposits of interferring additive already formed on metal surfaces, thereby permitting the fluoropolymer processing aid to coat the metal surfaces without interference by the additive.

It is not required that polar-side-group-containing extrusion adjuvant be compatible with host polyolefin. However, compatibility can be desirable if appearance is critical. It is also desired that adjuvant not exude to the surface of the polyolefin.

When the processing aid system of this invention is used in a polyolefin for film applications, the polyolefin generally will have a melt index (ASTM D-1238) of 5.0 or less at 190° C., preferably 2.0 or less. For high-shear melt processing such as fiber extrusion or injection molding, even high-melt-index resins, for example, those having a melt index of 20 or more, may suffer processing difficulties. Such polyolefins may comprise any thermoplastic hydrocarbon polymer obtained by the homopolymerization or copolymerization of one or more monoolefins of the formula $CH_2=CHR'$ wherein R' is an alkyl radical, usually of not more than eight carbon atoms. In particular, this invention is applicable to the following: polyethylene, both of the high-density type and the low-density type having densities within the range 0.89–0.97; polypropylene; polybutene-1; poly(3-methylbutene); poly(4-methylpentene); and linear low density copolymers of ethylene and an alpha-olefin, such as propylene, butene-1, hexene-1, octene-1, decene-1, octadecene-1, or n-methylpentene-1.

Because of the different melt characteristics of the olefin polymers mentioned, the addition of fluoropolymer processing aids may be of greater value in some polyolefins than in others. Thus, polyolefins such as polypropylene and branched polyethylene, that have low molecular weight or broad molecular weight distributions and, therefore, have good melt flow characteristics even at low temperature, may require the use of fluoropolymer additives only under unusual, adverse extrusion conditions, in which circumstances these polyolefins are difficultly melt-processible polymers. However, polymers such as high molecular weight, high density polyethylene or linear low density ethylene copolymers, particularly those with narrow or very narrow molecular weight distributions, are normally difficultly melt-processible and addition of fluoropolymers can be especially beneficial. If an additive having divalent or trivalent metal cations and organic or inorganic anions is present in the polyolefin, use of polar side group containing extrusion adjuvant in conjunction with the fluoropolymer processing aid will also be beneficial.

A composition for extrusion to final product, e.g., film, will commonly contain a major portion of polyolefin, a minor portion of additive or additives having divalent or trivalent metal ions and organic or inorganic anions, and a minor portion of fluoropolymer processing aid. The minor constituents will usually be present in concentrations of less than 1 wt % each, most frequently less than 2500 ppm each. The amount of minor constituents actually present can vary with the polyolefin, the extrusion conditions, and other factors. In general, prior to the present invention, the presence of an additive having divalent or trivalent metal ions and organic or inorganic anions would require a relatively high concentration of fluoropolymer processing aid to achieve satisfactory extrusion performance.

The concentration of polar-side-group-containing extrusion adjuvant in a composition of this invention for extrusion to final product will vary at least with the concentration of additive having divalent or trivalent metal ions and organic or inorganic anions and the effectiveness of the selected adjuvant. In general, the effective concentration of polar-side-group-containing adjuvant will be less than 2 wt %, preferably no more than 1 wt %, and most preferably no more than 2000 ppm. Optionally, of course, one can use excess adjuvant if it is otherwise acceptable in the composition. Minimum concentration of adjuvant is about 50 ppm. As a consequence of the use of polar-side-group-containing adjuvant, the concentration of fluoropolymer processing aid can be reduced within the limits stated above. Stated proportions are based on the combined weight of the four named constituents. Other constituents as known in the art, e.g., antiblock agent, can also be present but are not included in the calculation of concentrations of the named constituents.

An extrusion composition comprising a major portion of polyolefin and minor portions of additive having divalent or trivalent metal ions and organic or inorganic anions, fluoropolymer processing aid, and polar-side-group-containing adjuvant may be formulated in numerous ways. For example, the individual minor constituents as pure compositions can be added to the polyolefin sequentially, simultaneously, or in some combination. One or more or all of the minor constituents can be incorporated into a carrier before incorporation into the polyolefin. The minor constituents can be in separate carriers, or one or more of the minor constituents can be in the same carrier.

Since additives such as acid scavengers are normally incorporated into a polyolefin by the manufacturer of the polyolefin, it may be advantageous for the fluoropolymer processing aid and the polar-side-group-containing adjuvant to be combined in a processing aid system composition. The processing aid system composition provided by this invention comprises fluoropolymer processing aid and polar-side-group-containing adjuvant. If the adjuvant has suitable rheological properties, the processing aid system can consist essentially of fluoropolymer processing aid and polar-side-group-containing adjuvant. This might be the case, for example, if the polar-side-group-containing adjuvant is polymeric, such as an EVOH resin, an ethylene/acrylic acid copolymer, an ethylene/methacrylic acid copolymer, or an ionomeric resin. Alternatively, if lower concentration is desired or if the properties of processing aid and adjuvant are not suitable for a two-component system, the processing aid system compositon can further comprise a polymeric host. The polymeric host is at least compatible with the polyolefin of the extrusion composition of this invention. In particular, the polymeric host can itself be a polyolefin, either the same as or different from the polyolefin of the extrusion composition. The concentration ratio of polar-side-group-containing extrusion adjuvant and fluoropolymer processing aid in the processing aid system composition can vary widely. Adjuvant and processing aid can be present in approximately equal weight proportions, or either one can be the major component and the other the minor component. In general, the concentration ratio of adjuvant to fluoropolymer will be in the range of about 30/70 to about 95/5, preferably in the range of about 50/50 to about 85/15. When a polymeric host is used in the processing aid system composition, the amount of polymeric host usually is at least equal to the combined amount of extrusion adjuvant and processing aid, by weight. Polymeric polar-side-group-containing adjuvants are preferred for processing aid system compositions, especially when the processing aid system composition consists essentially of polar-side-group-containing extrusion adjuvant and fluoropolymer processing aid. For example, a processing aid system might consist of 75 wt % of ionomeric resin and 25 wt % of fluoropolymer processing aid.

Purge compounds comprising polar-side-group-containing adjuvant can be effective in conditioning extrusion equipment to minimize start-up time for extrusion of an extrusion composition to final product, and are within the scope of this invention. This discovery is surprising in view of prior art on functional-group-containing fluoropolymers. Examined Japanese Patent Application Publications 55543/1988 and 55544/1988 disclose certain fluorinated polymers having —$SO_3M$ groups (M=alkali metal) as processing aids for polyolefins. U.S. Pat. No. 5,064,594 discloses that the extrusion of difficultly-melt-processible polymers, including polyolefins, containing fluoropolymer process aids is greatly improved by, first, extruding a polymer composition containing a copolymer of tetrafluoroethylene and a functional-group-containing monomer, the possible functional groups including —$SO_3M$. In contrast, the polar-side-group-containing adjuvants of the present invention are not effective as processing aids for polyolefins, at least in the concentrations used for the adjuvant effect. See Control D, below. Purge compound compositions comprise a base resin, preferably polyolefin either the same as or different from the polyolefin to be extruded subsequently, and polar-side-group-containing adjuvant. The adjuvant in the purge compound can be the same as or different from the adjuvant used in the extrusion composition of this invention. The concentration of polar-side-group-containing adjuvant in a purge compound compositon is generally higher than used in a composition for extrusion to final product, generally at least 0.1 wt % and preferably at least 0.5 wt %, and can range up to several wt %, 1 wt % for example or even 5 or 10 wt %. Polymeric polar-side-group-containing adjuvants can even be the major component of a purge compound composition, but usually will be a minor component.

EXAMPLES

The evaluations reported in the following examples employed a C. W. Brabender Instruments, Inc. Computerized Plasti-Corder® equipped with a 19.1 mm (0.75 inch) extruder with a 25/1 length/diameter ratio. The screw had 10 feed flights, 10 compression flights with a 3:1 compression ratio, and 5 metering flights. Operating parameters were controlled by four independent heating zones, two pressure transducers, and a torque measuring drive unit with 1–120 rpm capability. The instrument was equipped with software for rheometric extrusion testing. The extrusion head used for these tests was a horizontal ribbon (tape) die body, supplied by C. W. Brabender, made from #416 ferritic stainless steel and designed to accept die inserts such that the exit width was 2.54 cm (1.0 inch), the land length was 1.016 cm (0.4 inch) and the die gap was a nominal 0.51 mm (0.02 inch). Die inserts used were chrome-plated tool steel. The die inserts were cleaned prior to each evaluation by scrubbing with a Scotchbrite® pad (3M Company) and washing with acetone.

In operation, the required machine conditions were set and the polymer resin was extruded, usually at 30 rpm, until equilibrium was reached as judged by constant throughput and constant die pressure. For a linear low density polyethylene (LLDPE) with a melt index (MI) of 1.0 at 190° C., extrusion at 30 rpm at 200° C. measured at the die gave throughput of about 7.8 g/min and pressure at the die of about 34–41 MPa (5000–6000 psig), depending on the exact die gap. Unless otherwise stated, die temperature was set at 204° C. for the tests summarized below.

A typical sequence of experiments was carried out according to the composition schedule in Table 1. Once the machine was determined to be clean and operating at standard conditions, the baseline compound was introduced to the machine and allowed to reach equilibrium. As indicated in Table 1, the baseline compound was a polyolefin containing an added quantity of an interferring acid scavenger, 2500 ppm in the illustration. Other additives, e.g., antiblock agent, might also be present; if so, such will be stated. Then, the compound containing the lowest level of fluoropolymer additive (50 ppm) and the level of adjuvant chosen for the particular test, 500 ppm in the illustration, was introduced and run for one hour, which was comfortably beyond the time normally required to reach equilibrium. At the end of the hour, the throughput, die pressure and extrudate appearance were recorded. The compound containing the next higher level of the fluoropolymer additive was then introduced and allowed to run for one hour. Adjuvant concentration was held constant throughout the test, while fluoropolymer concentration was increased in 50 ppm increments. Stated concentrations are based on the combined weights of polyolefin resin and all additives. This sequence was continued, increasing the level of the fluoropolymer additive each hour, until the extrudate was free of melt fracture. If melt fracture was not eliminated when the fluoropolymer processing additive concentration had been increased to 450 ppm, the test was terminated. The presence or absence of melt fracture was judged by visual examination of extrudate surface quality. In the illustration of Table 1, melt fracture (MF) was eliminated by 350 ppm of fluoropolymer processing aid, so test steps 8 and 9 would not be run.

TABLE 1

Typical Test Sequence

| Step | Concentration (ppm) | | | Observation |
| | Proc. Aid | Adjuvant | Acid Scav. | |
| --- | --- | --- | --- | --- |
| Base | 0 | 0 | 2500 | MF |
| 1 | 50 | 500 | 2500 | MF |
| 2 | 100 | 500 | 2500 | MF |
| 3 | 150 | 500 | 2500 | MF |
| 4 | 200 | 500 | 2500 | MF |
| 5 | 250 | 500 | 2500 | MF |
| 6 | 300 | 500 | 2500 | MF |
| 7 | 350 | 500 | 2500 | No MF |
| 8 | 400 | 500 | 2500 | No Test |
| 9 | 450 | 500 | 2500 | No Test |

After each series of experiments, the die inserts were removed and the extruder and die body were purged with one of several materials, such as PCX-12 available from Du Pont of Canada, grade 3535 polyethylene from the Du Pont Company, LLDPE with melt index of 1, or LLDPE containing 10% silica. Replacement die inserts were installed. After calibration of the transducers, the base polyolefin resin (not the baseline compound) was run first to establish equilibrium conditions and to assure that reliable output was being obtained. If previously established equilibrium values for the base polyolefin resin were not achieved, the cleanout procedure was repeated.

Examples 1–7 and Controls A–C

The polyolefin resin used in this series of tests was GRSN 7047, an LLDPE with MI=1.0 in granular form from Union Carbide Corp. Either calcium stearate (CaSt) or zinc stearate (ZnSt) was added, at 2500 ppm in either case. The fluoropolymer processing aid was an elastomeric copolymer of vinylidene fluoride and hexafluoropropylene prepared generally according to U.S. Pat. No. 3,051,677. Various adjuvants tested are identified as follows:

EDTA=ethylene diamine tetracetic acid (Baker Chemical)

K2-EDTA=dipotassium salt of EDTA (Baker Chemical)

PVA=polyvinyl alcohol (ELVANOL®, grade 9050, DuPont Co.)

EVOH=ethylene/vinyl alcohol copolymer, 44 mol % ethylene, 12 MI.

Ionomer=zinc-neutralized ethylene/methacrylic acid copolymer, MI=1.6. (SURLYN® ionomer resin grade 9730, DuPont Co.)

Compositions for extrusion testing according to the general procedure recited above were prepared by combining all components in a large polyethylene bag and shaking vigorously. Results are summarized in Table 2, showing concentrations of adjuvants used and the concentration of fluoropolymer processing aid that eliminated melt fracture (lowest level that eliminated melt fracture under the test conditions). Controls A–C show that the calcium and zinc stearate additives interfere with the effectiveness of the fluoropolymer processing aid. I.e., Controls B and C require more processing aid to eliminate melt fracture than Control A. The results for the Examples show that the various polar-side-group-containing adjuvants counteract the deleterious effect of these additives and enhance the effectiveness of the processing aid in the presence of the additives. I.e., Examples 1–7 require less processing aid to eliminate melt fracture than the appropriate Controls.

TABLE 2

Results for Examples 1–7 and Controls

| Example or Control | Additive | Adjuvant Type | Conc. (ppm) | Proc. Aid Conc. (ppm) |
|---|---|---|---|---|
| A | None | None | 0 | 50 |
| B | CaSt | None | 0 | 400 |
| 1 | CaSt | EDTA | 500 | 250 |
| 2 | CaSt | EDTA | 250 | 100 |
| 3 | CaSt | K2-EDTA | 250 | 200 |
| 4 | CaSt | PVA | 500 | 250 |
| 5 | CaSt | EVOH | 500 | 150 |
| 6 | CaSt | Ionomer | 500 | 150 |
| C | ZnSt | None | 0 | >450* |
| 7 | ZnSt | EDTA | 500 | 150 |

*Melt fracture still present at 450 ppm.

Control D

As indicated by the levels of fluoropolymer processing aid required to eliminate melt fracture in the presence of polar-side-group-containing adjuvant in Examples 1–7, the elimination of melt fracture is not attributable to adjuvant alone. To reinforce this conclusion, GRSN 7047 was tested again with no additives (i.e., the base polyolefin resin as in Control A) and then with 500 ppm of the ionomer adjuvant of Example 6. The ionomer produced no change either in appearance of the extrudate or in die pressure, i.e., did not act as a processing aid.

Example 8 and Controls

The polyolefin resin again was GRSN 7047, with 2500 ppm of calcium stearate (CaSt) added. The fluoropolymer processing aid was the same fluoroelastomer used in Examples 1–7. The polar-side-group-containing adjuvant was an ethylene/methacrylic acid copolymer (NUCREL® acid copolymer resin grade 1202, DuPont Co.). Results are summarized in Table 3. As before, the processing aid concentration shown is the lowest test level that eliminated melt fracture. With the acid copolymer adjuvant present, the amount of fluoropolymer processing aid required to eliminate melt fracture was reduced.

TABLE 3

Results for Example 8 and Controls

| Example or Control | Additive | Adjuvant Type | Conc. (ppm) | Proc. Aid Conc. (ppm) |
|---|---|---|---|---|
| E | None | None | 0 | 50 |
| F | CaSt | None | 0 | 400 |
| 8 | CaSt | Acid Copol. | 1200 | 300 |

Example 9 and Controls

The polyolefin resin again was GRSN 7047, with 2500 ppm of calcium stearate (CaSt) added. The fluoropolymer processing aid for these tests was a partially-crystalline copolymer of tetrafluoroethylene and hexafluoropropylene as disclosed in U.S. Pat. No. 5,266,639, having peak melting temperature of about 173° C. and end of crystalline melting of about 204° C. by differential scanning calorimetry. The polar-side-group-containing adjuvant was a sodium-neutralized low molecular weight ionomer resin (AClyn® 285A, Allied-Signal Corp.). Results are summarized in Table 4. As before, the processing aid concentration shown was the lowest test level that eliminated melt fracture. With the ionomer adjuvant present, the amount of fluoropolymer processing aid required to eliminate melt fracture was reduced.

TABLE 4

Results for Example 9 and Controls.

| Example or Control | Additive | Adjuvant Type | Conc. (ppm) | Proc. Aid Conc. (ppm) |
|---|---|---|---|---|
| G | None | None | 0 | 50 |
| H | CaSt | None | 0 | 500 |
| 9 | CaSt | Ionomer | 500 | 300 |

Example 10 and Controls

The polyolefin resin again was GRSN 7047, this time with 2500 ppm of hydrotalcite added (DHT-4A, Kyowa Chemicals). The fluoropolymer processing aid was the same fluoroelastomer used in Examples 1–7. The polar-side-group-containing adjuvant was the ionomer used in Example 6. Results are summarized in Table 5. As before, the processing aid concentration shown was the lowest test level that eliminated melt fracture. With the acid copolymer adjuvant present, the amount of fluoropolymer processing aid required to eliminate melt fracture was reduced.

TABLE 5

Results for Example 10 and Controls

| Example or Control | Additive | Adjuvant Type | Conc. (ppm) | Proc. Aid Conc. (ppm) |
|---|---|---|---|---|
| I | None | None | 0 | 50 |
| J | Hydrotalcite | None | 0 | 400 |
| 10 | Hydrotalcite | Acid Copol. | 1200 | 300 |

Example 11

A processing aid system composition was prepared by extrusion compounding four parts of sodium-neutralized ionomer resin having MI=2.8 (SURLYN®, grade 8940, DuPont Co.) and one part of fluoropolymer processing aid that was a combination, according to the teachings of U.S. Pat. No. 4,904,735, of an elastomeric copolymer of $VF_2$ and HFP of weight proportions $VF_2$/HFP=60/40 and having glass transition temperature below test temperature, and a plastic TFE/HFP copolymer (FEP) having crystalline melting temperature of about 265° C. When introduced with appropriate let-down (dilution) into polyolefin containing calcium stearate, it was found to perform the same in extrusion testing as an extrusion composition prepared as a powder blend.

Examples 12–14 and Controls

The polyolefin resin was an LLDPE with MI=1.0 and known to contain an acid scavenger in a proprietary formulation (Dowlex® 2045, Dow Chemical Co.). To this commercially available resin was added 5000 ppm of Super Floss® silica (Manville Sales Corp.) antiblock agent, using an appropriate amount of a 20 wt % masterbatch in low density polyethylene with MI=9.0 (masterbatch from Ampacet Corp.). Two fluoropolymer processing aids were used. Fluoropolymer processing aid #1 was the same elastomeric copolymer used in Examples 1–7. Fluoropolymer processing aid #2 was the fluoroelastomer/fluoroplastic combination used in Example 11. Two polar-side-group-containing adjuvants, both ionomers, were used. Ionomer #1 was zinc-neutralized with MI=14 (SURLYN® grade 9970, DuPont Co.) while ionomer #2 was sodium-neutralized with MI=1.3 (SURLYN® grade 8527, DuPont Co.). For the various combinations of processing aid and adjuvant tested, processing aid system compositions were prepared by extrusion compounding four parts of the particular ionomer resin and one part of the particular fluoropolymer processing aid. Results are summarized in Table 6. As before, the processing aid concentration shown was the lowest test level that eliminated melt fracture. Since processing aid system compositions were used to introduce both processing aid and polar-side-group-containing adjuvant, the ratio of adjuvant to processing aid is necessarily constant in the table. The results show that the adjuvant was effective in reducing the amount of fluoropolymer processing aid required to eliminate melt fracture even in the presence of antiblock agent.

TABLE 6

Results for Examples 12–14 and Controls

| Example or Control | Adjuvant | | Processing Aid | |
|---|---|---|---|---|
| | Type | Conc. (ppm) | Type | Conc. (ppm) |
| K | None | 0 | PA #1 | 500 |
| 12 | Ionomer #1 | 600 | PA #1 | 150 |
| L | None | 0 | PA #2 | 250 |
| 13 | Ionomer #1 | 600 | PA #2 | 150 |
| 14 | Ionomer #2 | 400 | PA #2 | 100 |

Example 15

At the end of Control C, the test had been running for 9 hr with increasing levels of fluoropolymer processing aid without elimation of melt fracture. The extrusion system was then purged with a blend of 1 wt % EDTA in GRSN 7047 polyethylene for 15 min. Extrusion was then resumed with 2500 ppm of zinc stearate and 450 ppm of fluoropolymer processing aid in GRSN 7047, the same composition running at the end of Control C. The extrudate was free of melt fracture in 15 min, illustrating that a purge compound containing polar-side-group-containing adjuvant can be effective in conditioning extrusion equipment to minimize start-up time. In this instance, there was no polar-side-group-containing extrusion adjuvant in the extrusion composition of Control C. However, there was a large concentration, 450 ppm, of fluoropolymer processing aid. It is conjectured that the purge composition removed the interferring effect caused by the presence of zinc stearate additive by cleaning the die, and then the large concentration of fluoropolymer processing aid was sufficient to coat the clean metal die surfaces before sufficient deposit from the zinc stearate additive could form to interfere with the fluoropolymer processing aid. However, the extrudate would not be expected to remain free from melt fracture for extended time without polar-side-containing adjuvant in the extrusion composition.

What is claimed is:

1. In the process of extruding a composition comprising polyolefin, additive having divalent or trivalent metal cations and organic or inorganic anion, and fluoropolymer processing aid, the improvement comprising incorporating into said composition polar-side-group-containing extrusion adjuvant in an amount effective to counteract the deleterious effect of said additive on performance of said processing aid in extrusion of said composition, said adjuvant being essentially free of fluorine, said deleterious effect being the requirement for an increase in the amount of said processing aid necessary to maintain extrusion performance obtained by said processing aid in the absence of said additive, whereby said increase is unnecessary, said processing aid improving extrusion performance by mitigating against melt fracture, high extrusion pressure, high torque, formation of deposits at the die exit, or fluctuations in extrusion pressure or extrusion rate, said adjuvant having at least four polar side groups.

2. Extrusion composition comprising polyolefin, additive having divalent or trivalent metal ions and organic or inorganic anions, fluoropolymer processing aid, and an amount of polar-side-group-containing extrusion adjuvant effective to counteract the deleterious effect of said additive on performance of said processing aid in extrusion of said composition, said adjuvant being essentially free of fluorine, and having at least four polar side groups.

3. The extrusion composition of claim 2, wherein said polar-side-group-containing extrusion adjuvant is polymeric.

4. The extrusion composition of claim 3, wherein said polymeric adjuvant is polyvinylacetate, ethylene/vinyl acetate copolymer, ethylene/acrylic acid copolymer, ethylene/methacrylic acid copolymer, ethylene/vinyl alcohol copolymer, or polyvinyl alcohol.

5. The extrusion composition of claim 3, wherein said polymeric adjuvant is ionomer.

6. The extrusion composition of claim 2, wherein said polar-side-group-containing extrusion adjuvant is ethylene diamine tetraacetic acid or salt thereof.

7. The extrusion composition of claim 2, wherein the concentration of said polar-side-group-containing extrusion adjuvant is less than 2 wt %.

8. The extrusion composition of claim 2, wherein the concentration of said polar-side-group-containing extrusion adjuvant is 50 ppm to 1 wt %.

9. Processing aid system composition comprising fluoropolymer processing aid and polar-side-group-containing extrusion adjuvant, said adjuvant being essentially free of fluorine, said system being capable of enhancing extrusion performance of polyolefin which contains additive having divalent or trivalent metal cations and organic or inorganic anions, the proportion of said extrusion adjuvant in said processing aid composition, relative to the amount of processing aid therein, being effective to counteract the deleterious effect of said additive on performance of said processing aid, said adjuvant having at least four polar side groups.

10. The processing aid system composition of claim 9, further comprising polyolefin host resin.

11. The processing aid system composition of claim 9, wherein said extrusion adjuvant is polymeric.

12. The processing aid system composition of claim 11, wherein said polymeric extrusion adjuvant is polyvinylacetate, ethylene/vinyl acetate copolymer, ethylene/acrylic acid copolymer, ethylene/methacrylic acid copolymer, ethylene/vinyl alcohol copolymer, or polyvinyl alcohol.

13. The processing aid system composition of claim 11 wherein said polymeric extrusion adjuvant is ionomer.

14. The processing aid system composition of claim 9, wherein the ratio of said polar-side-group-containing extrusion adjuvant to fluoropolymer processing aid is in the range of about 30/70 to about 95/5 by weight.

15. Extruder purge composition comprising polyolefin and an amount of polar-side-group-containing extrusion adjuvant effective to condition an extruder so that start-up time to achieve quality extrusion composition is reduced, said adjuvant being essentially free of fluorine and having at least four polar side groups.

16. The extruder purge composition of claim 15 wherein the extrusion composition comprises polyolefin, additive having divalent or trivalent metal cations and organic or inorganic anions, fluoropolymer processing aid, and polar-side-group-containing extrusion adjuvant, said adjuvant being essentially free of fluorine.

17. The extruder purge composition of claim 15, wherein said adjuvant is ethylene diamine tetraacetic acid or salt thereof or polymer selected from the group consisting of polyvinylacetate, ethylene/vinyl acetate copolymer, ethylene/acrylic acid copolymer, ethylene/methacrylic acid copolymer, ethylene/vinyl alcohol copolymer, and polyvinyl alcohol.

18. The extruder purge composition of claim 15, wherein the concentration of said adjuvant is about 0.1–10 wt %.

19. A process for conditioning extrusion equipment, wherein an extruder purge composition is extruded through the extrusion equipment prior to extrusion of an extrusion composition to final product, said purge composition comprising polyolefin and an amount of polar-side-group-containing extrusion adjuvant effective to condition an extruder so that start-up time to achieve quality extrusion of said extrusion composition is reduced, said adjuvant being essentially free of fluorine and having at least four polar side groups.

20. The processing aid system of claim 9 wherein said extrusion adjuvant is ethylene diamine tetraacetic acid or salt thereof.

21. The extruder purge composition of claim 15 wherein said adjuvant is ionomer.

22. In the process of extruding a composition comprising polyolefin, additive having divalent or trivalent metal cations and organic or inorganic anions, and fluoropolymer processing aid, the improvement comprising incorporating into said composition polar-side-group-containing extrusion adjuvant, said adjuvant being essentially free of fluorine and having at least four polar side groups.

23. In the process of claim 22, wherein the amount of said polar-side-group-containing extrusion adjuvant is from 50 ppm to less than 2 wt %.

24. Extrusion composition comprising polyolefin, additive having divalent or trivalent metal ions and organic or inorganic anions, fluoropolymer processing aid, and from 50 ppm to less than 2 wt % of polar-side-group-containing extrusion adjuvant, said adjuvant being essentially free of fluorine and having at least four polar side groups.

25. Processing aid system composition comprising fluoropolymer processing aid and polar-side-group-containing extrusion adjuvant, said adjuvant being essentially free of fluorine and having at least four polar side groups, the ratio of said polar-side-group-containing adjuvant to fluoropolymer processing aid being in the range of about 30/70 to about 95/5 by weight.

* * * * *